United States Patent

Schweiger

[11] Patent Number: 5,803,465
[45] Date of Patent: Sep. 8, 1998

[54] GASKET INSERT

[75] Inventor: David J. Schweiger, Downers Grove, Ill.

[73] Assignee: Dana Corporation, Toledo, Ohio

[21] Appl. No.: 763,266

[22] Filed: Dec. 10, 1996

[51] Int. Cl.⁶ ..................................................... F16J 15/12
[52] U.S. Cl. ........................ 277/593; 277/598; 277/630; 277/640
[58] Field of Search ................................. 277/9, 11, 166, 277/180, 189, 235 B

[56] References Cited

U.S. PATENT DOCUMENTS

| | | | |
|---|---|---|---|
| 1,468,824 | 9/1923 | McIntyre | 277/9 |
| 3,108,818 | 10/1963 | Furstenburg | 277/189 |
| 3,167,324 | 1/1965 | Kratochvil | 277/235 B |
| 3,182,120 | 5/1965 | Duhn . | |
| 3,332,141 | 7/1967 | Hopp | 277/9 |
| 3,565,449 | 2/1971 | Ascencio et al. | 277/235 B |
| 3,578,346 | 5/1971 | Jelinek | 277/180 |
| 4,041,241 | 8/1977 | Olmstead et al. | 277/189 |
| 4,317,576 | 3/1982 | Barker et al. | 277/235 B |
| 4,376,539 | 3/1983 | Baldacci | 277/9 |
| 4,392,657 | 7/1983 | Roley | 277/166 |
| 4,605,236 | 8/1986 | Tsuchihashi et al. | 277/235 B |
| 5,039,117 | 8/1991 | Gohrlich et al. | 277/189 |
| 5,310,198 | 5/1994 | Belter | 277/189 |
| 5,340,126 | 8/1994 | Antonini et al. | 277/189 |
| 5,340,170 | 8/1994 | Shinohara et al. | 277/189 |
| 5,558,346 | 9/1996 | Hartery | 277/166 |

*Primary Examiner*—Randolph A. Reese
*Assistant Examiner*—John L. Beres
*Attorney, Agent, or Firm*—Rader, Fishman & Grauer, PLLC

[57] ABSTRACT

A gasket insert including a carrier having at least two retaining arms. The retaining arms are adapted to contact opposing faces of a gasket material to form a mechanical means of fastening the gasket insert to a gasket body. Also disclosed is a method of making a gasket insert including forming a carrier body from a steel stamping and folding the steel stamping upon itself to create a double layered carrier body. The carrier body is fitted with retaining arms for gripping the gasket body and is fitted with a plurality of passages for filling with sealing material and forming a positive means of mechanically bonding sealing material to the carrier body.

7 Claims, 2 Drawing Sheets

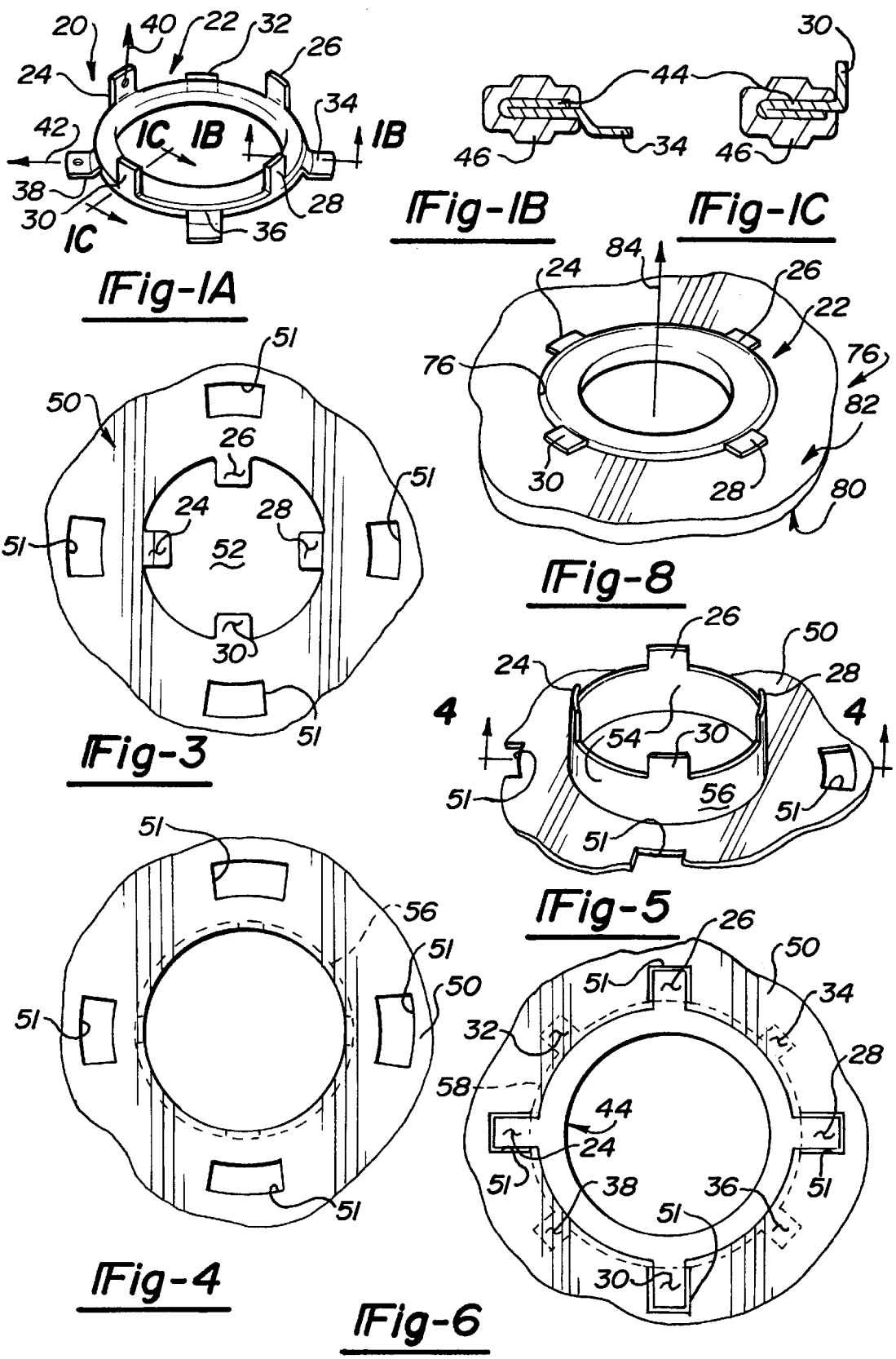

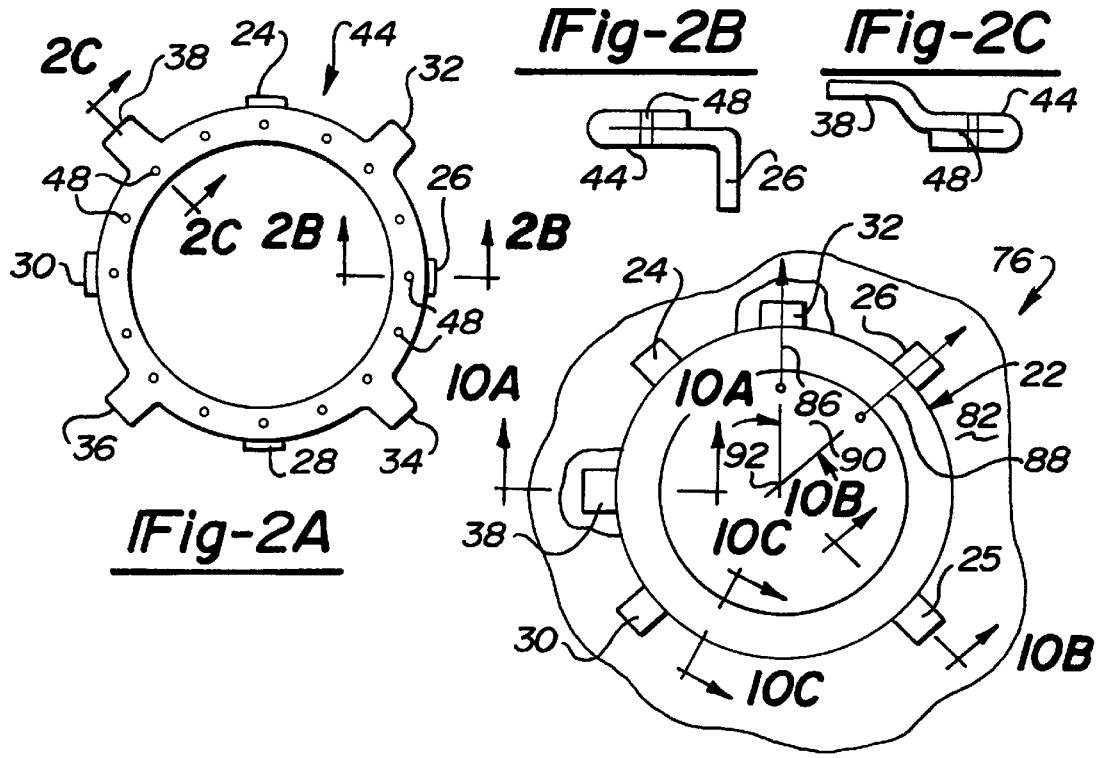
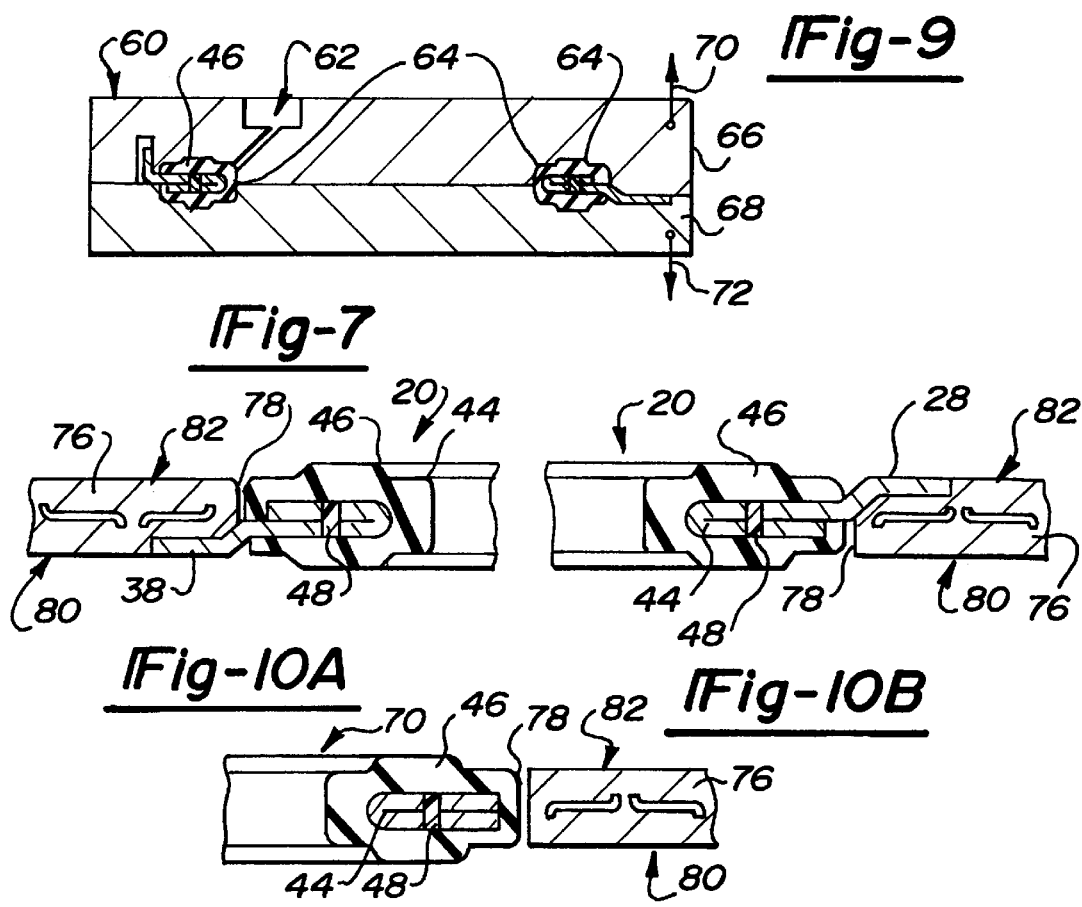

GASKET INSERT

FIELD OF THE INVENTION

The present invention generally relates to gaskets and more particularly relates to gasket inserts.

BACKGROUND OF THE INVENTION

In designing gaskets it is common to incorporate transfer seals (or also known as inserts) into the gasket body. Transfer seals are used to accommodate fluid flow between two members and act to prevent the fluid from seeping between the mating surfaces of the two members. Transfer seals are often used in automotive head gaskets where the fluid flowing between the engine head and the engine block may be engine coolant or engine lubricating oil.

Although transfer seals have been used for sometime, there still does not exist a highly reliable method of attaching a transfer seal to a gasket body. Current attachment techniques include the use of adhesives or press fitting a molded insert into the gasket body. Use of Adhesives tends to be unreliable and they are especially prone to failure during shipping of the gasket (prior to installing the gaskets). Accordingly, inserts which have been attached to the gasket body by way of adhesives, generally require that the gaskets be handled and transported in a delicate manner.

SUMMARY OF THE INVENTION

The present invention is directed to a gasket insert which includes a carrier body and first and second retaining arms extending from the carrier body. The first retaining arm includes an end portion which extends from the carrier body in a first direction and the second retaining arm includes an end portion which extends from the carrier body in a second direction. The first direction is generally perpendicular to the second direction.

The present invention is also directed to a gasket assembly including a gasket body and a carrier body. The carrier body is disposed in an opening in the gasket body and the carrier body includes first and second retaining arms. First retaining arm has an end portion which extends from the carrier body in a first direction in a first plane and the second retaining arm includes an end portion which extends from the carrier body in a second direction in a second plane. The first and second planes are spaced apart.

Also, the present invention includes a method of making a gasket insert including forming an opening in a piece of generally planar sheet metal and shaping the opening such that it includes inwardly pointing retaining arms. Next, a metal in the area surrounding the opening is drawn away from the generally planar piece of sheet metal such that it forms a cylindrical column rising above the generally planar piece of sheet metal. The next step is accomplished by deforming the cylindrical column to hold against the generally planar piece of metal such that the inwardly pointing fingers are made to point outwardly. Lastly, the piece is severed from a generally planar piece of sheet metal in a manner such that a second set of outwardly pointing retaining arms are formed along a periphery of said severed piece.

BRIEF DESCRIPTION OF THE DRAWINGS

The features and inventive aspects of the present invention will become more apparent upon reading the following detailed description, claims, and drawings of which the following is a brief description:

FIG. 1A is a perspective view of the gasket insert of the present invention.

FIG. 1B is a cross-sectional view taken substantially along lines 1B—1B of FIG. 1A.

FIG. 1C is a cross-sectional view taken substantially along lines 1C—1C of FIG. 1A.

FIG. 2A is a bottom view of the carrier body portion of the gasket insert of FIG. 1A.

FIG. 2B is a cross-section view taken substantially along lines 2B—2B of FIG. 2A.

FIG. 2C is a partial cross-sectional view taken substantially along lines 2C—2C of FIG. 2A.

FIGS. 3–6 depict the method steps for fabricating the carrier body of FIG. 2A.

FIG. 7 depicts the method step of coating the carrier body of FIG. 2A with a sealing material.

FIG. 8 is a perspective view of the combination of a gasket body combined with the gasket insert of FIG. 1A.

FIG. 9 is a top view of a gasket assembly of FIG. 8.

FIG. 10A is a partial cross-section view taken substantially along lines 10A—10A of FIG. 9.

FIG. 10B is a partial cross-sectional view taken substantially along lines 10B—10B of FIG. 9.

FIG. 10C is a partial cross-sectional view taken substantially along lines 10C—10C of FIG. 9.

DETAILED DESCRIPTION OF THE PREFERRED EMBODIMENTS

The gasket insert 20 of the present invention includes carrier 22 first retaining arms 24–30, and second retaining arms 32–38. First retaining arms 24–30 each have an end portion which extends from carrier 22 in an axial direction 40 (for the sake of clarity axial direction 40 is only specifically labeled with respect to first retaining arm 24). Second retaining arms 32–38 extend from the carrier in a radial direction 42 (for the sake of clarity only second retaining arm 38 is specifically labeled showing radial direction 42).

Now referring to FIGS. 1A–1C and 2A–2C, carrier 22 is preferably comprised of stamped steel carrier body 44 which is covered with sealing material 46. Carrier body 44 includes a plurality of passages 48 (not shown in FIGS.s 1B and 1C; but see FIG. 2A). These passages allow the free flow of sealing material therethrough during its application (in liquid form) to carrier body 44. Once sealing material 46 solidifies, it is trapped within passages 48 and forms a secure mechanical bond to carrier body 44. Sealing material 46 can be comprised of any number of materials which are commonly used in the fabrication of transfer seals in gaskets including rubber and silicone.

Now referring to FIGS. 3–6, carrier body 44 is preferably fabricated using the following method:

1) An opening 52 formed in a generally planar steel sheet 50. Opening 52 is preferably formed by way of a piercing operation. Opening 52 includes inwardly pointing retaining arms 24–30 (see FIG. 3). Also included are four holes 51 required to facilitate subsequent severing operation set forth in Step 4.

2) Next, the portion steel sheet 50 in the vicinity of opening 52 is drawn away from the plane in which the generally planar piece of sheet metal 50 lies such that the drawn portion forms a cylindrical column 56 rising above generally planar piece of sheet metal 50 (see FIGS. 4 and 5).

3) Cylindrical column 56 is then deformed toward generally planar steel sheet 50 such that it is folded against sheet 50 in a way which causes inwardly pointing fingers 24–30 to reorient themselves and point outwardly (see FIG. 6).

4) Lastly steel carrier body 44 is severed from steel sheet 50 along a periphery defined by dotted line 58 (see FIG. 6). Arms 24–30 are not severed but rather they are left in place.

Additionally, passages 48 (see FIG. 2A) are formed in carrier body 44 (preferably by way of a piercing operation) and retaining arms 24–30 are bent from their outwardly extending orientation shown in FIG. 6 to their perpendicular orientation as depicted in FIG. 2A. Preferably, the shearing, piercing, and bending operations are performed in a single step.

Now referring to FIG. 7, after the stamped steel carrier body 44 of FIG. 2A is formed, it is placed within injection mold cavity 64 of mold 60. Thereafter, sealing material 46 is injected (in a liquid state) into cavity 64, which surrounds carrier body 44, (but sealing material 46 is not allowed to flow against retaining arms 24–38). During its liquid state, sealing material 46 flows freely through sprue 62 and encircles carrier body 44. Once sealing material 46 solidifies mold halves 66, 68 are separated 70, 72 and the finished gasket insert 20 is removed.

The gasket assembly of the present invention includes gasket body 76 and gasket insert 20 disposed within an opening in gasket body 76.

Now referring to FIGS. 1A, 8,9, 10A, 10B and 10C, order to mount gasket insert 20 within opening 78 of gasket body 76, gasket insert 20 is oriented such that first retaining arms 24–30 are proximate opening 78 and retaining arms 32–38 are distal opening 78. Next, gasket insert 20 is moved 84 through opening 78 until retaining arms 32–38 abut the bottom surface 80 of gasket body 76 (second retaining arms 32–38 not shown in FIG. 8). Next, first retaining arms 24–30 are bent downwardly until they each abut top surface 82 of gasket body 76.

Now referring to FIGS. 8, 9, 10A–10C, once gasket insert 20 is fastened to gasket body 76 and first retaining arms 24–30 are bent against top surface 82 of gasket body 76, the orientation of first retaining arms 24–30, is such that they all lie in a first plane defined by upper surface 82 (see FIG. 9). Also, from FIGS. 6, 9, and 10A, it is demonstrated that second retaining arms 32, 34, 36 and 38 all lie in a second plane defined by bottom surface 80 of gasket body 76. The first plane and the second plane are separated by a distance approximately equal to the thickness of gasket body 76.

Now referring to FIG. 9, retaining arm 32 generally extends along the direction indicated by ray 86. Retaining arm 26 generally extends in the direction indicated by ray 88. Ray 86 and ray 88 differ in angular direction as indicated by angle 90 having an origin at 92. Thus, although retaining arms 32, 26 lie in generally parallel, spaced apart planes (defined by surfaces 80, 82 respectively), they are staggered 90 along the periphery of carrier 22, and extend in different directions 86, 88.

Preferred embodiments of the present invention have been disclosed. A person of ordinary skill in the art would realize, however, that certain modifications would come with the teachings of this invention. Therefore, the following claims should be studied to determine the true scope and content of the invention.

We claim:

1. A gasket insert, comprising:

a one-piece carrier body comprised of a steel stamping folded upon itself, said carrier body including an outer surface covered with a sealing material, a first retaining arm having an end portion which extends from said carrier body in a first direction, a second retaining arm having an end portion which extends from said carrier body in a second direction, and wherein said first direction is generally perpendicular to said second direction.

2. The gasket insert of claim 1, wherein said sealing material is selected from the group of rubber and silicone.

3. 2 gasket assembly, comprising:

a gasket body having at least one opening therein, a one-piece carrier body disposed in said gasket body opening, said carrier body comprised of a steel stamping folded upon itself including a first retaining arm having an end portion which extends from said carrier body in a first direction in a first plane, said carrier body also including a second retaining arm having an end portion which extends from said carrier body in a second direction in a second plane, wherein said first and second planes are spaced apart, and wherein said carrier body further includes an outer surface covered with a sealing material.

4. The gasket insert of claim 3, wherein said sealing material is selected from the group of rubber and silicone.

5. A gasket insert, comprising:

a one-piece carrier body comprised of a steel stamping folded upon itself, a plurality of passages extending through said carrier body, a first retaining arm having an end portion which extends from said carrier body in a first direction, a second retaining arm having an end portion which extends from said carrier body in a second direction, and wherein said first direction is generally perpendicular to said second direction.

6. The gasket insert of claim 5, wherein said carrier body includes an outer surface coated with a sealing material and wherein said plurality of passages contain said sealing material.

7. A gasket assembly, comprising:

a gasket body having at least one opening therein, a one -piece carrier body disposed in said gasket body opening, said carrier body comprised of a steel stamping folded upon itself including a first retaining arm having an end portion which extends from said carrier body in a first direction in a first plane, said carrier body also including a second retaining arm having an end portion which extends from said carrier body in a second direction in a second plane, wherein said first and second planes are spaced apart, and wherein said carrier body further includes a plurality of passages therethrough.

* * * * *

UNITED STATES PATENT AND TRADEMARK OFFICE
CERTIFICATE OF CORRECTION

PATENT NO : 5,803,465
DATED : September 8, 1998
INVENTOR(S) : David J. Schweiger It is certified that error appears in the above-identified patent and that said Letters Patent is hereby corrected as shown below:

Col. 4, line 17
 replace "2"
 with --A--.

Signed and Sealed this

Twenty-ninth Day of December, 1998

*Attest:*

BRUCE LEHMAN

*Attesting Officer*      Commissioner of Patents and Trademarks